Emery & Gott,
Fly Trap.
Patented May 22, 1866
N° 55,007.

Witnesses,
Samuel N. Piper
George Andrews

Inventors;
James Emery & Joseph E. Gott.
by their attorney.

UNITED STATES PATENT OFFICE.

JAMES EMERY AND JOSEPH E. GOTT, OF BUCKSPORT, MAINE, ASSIGNORS TO JAMES EMERY, OF SAME PLACE.

IMPROVEMENT IN FLY-TRAPS.

Specification forming part of Letters Patent No. 55,007, dated May 22, 1866.

*To all whom it may concern:*

Be it known that we, JAMES EMERY and JOSEPH E. GOTT, of Bucksport, in the county of Hancock and State of Maine, have invented a new and useful or Improved Fly-Trap; and we do hereby declare the same to be fully described in the following specification and represented in the accompanying drawings, of which—

Figure 1:
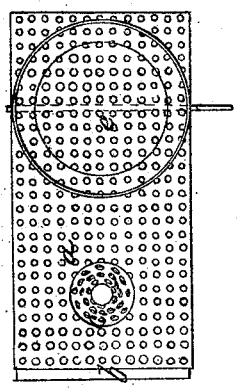
Figure 2:
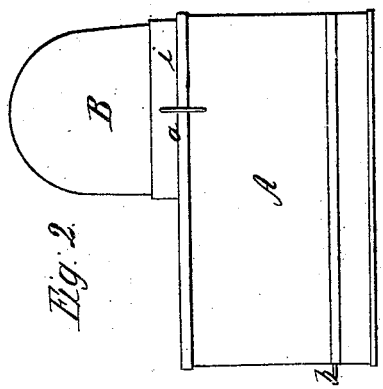
Figure 3:
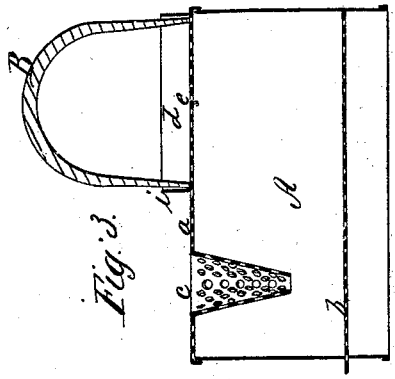

Figure 1 is a top view, Fig. 2 a side elevation, and Fig. 3 a longitudinal section, of it.

In the said drawings, A denotes a box, open at bottom and provided with a foraminous cover or top, $a$, and also with a foraminous partition or slide, $b$, the latter being arranged above the bottom of the box, and so as to slide into and out of the box through one end of it. The opposite sides of the box should be provided with creases or their equivalents for supporting the slide $b$. The use of this slide is to cover the bait.

From an opening, $c$, in the top of the box a foraminous conic frustum extends down into the box and to a short distance above the slide $b$. Furthermore, there is another or escape opening, $d$, on the top of the box, such being provided with a foraminous slide or turning damper, $e$. A rim or flange, $i$, extends around the opening $d$ concentrically, and serves to keep in place either a bell-glass or foraminous receiver, B, arranged over the damper and its opening.

When the trap is in use it is intended to be placed directly over a tray or shallow pan for holding bait or a mixture of molasses and vinegar. An equivalent for the slide $b$ would be a foraminous cover arranged on the bait-dish. The flies or insects, scenting the odor of the bait, will light on the top of the trap, and, perceiving the bait, will pass down the entrance-mouth or conic frustum and enter the box; but, finding themselves separated from the bait by the foraminous partition or slide, and perceiving the large escape-opening leading into the glass receiver, they will fly up through it and into the receiver. By turning the valve or damper they will be entrapped in the receiver, which from time to time may be removed and plunged into water, in order to kill the insects. This trap is very efficient in action.

The object of having the partition to slide into the box is to enable it to be removed, so as to allow the glass receiver to be packed within the box for the purpose of transportation or otherwise, as occasion may require.

We claim—

The said improved fly or insect trap as composed of the box with a foraminous top and partition or its equivalent, the tapering mouth or entrance frustum, the escape-opening, with its valve or damper, and the receiver or glass bell, arranged together substantially as specified.

JAS. EMERY.
JOSEPH E. GOTT.

Witnesses:
R. H. EMERY,
J. FRANK R. FOSS.